W. SCHULTZ.
HOE.
APPLICATION FILED JUNE 14, 1911.
1,072,657.
Patented Sept. 9, 1913.
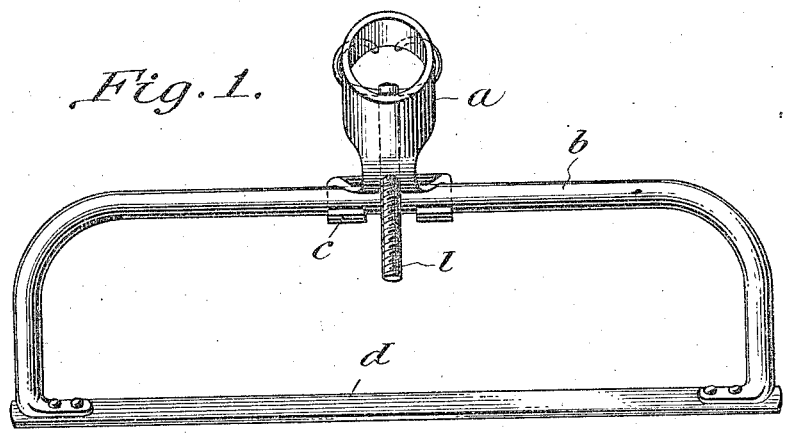
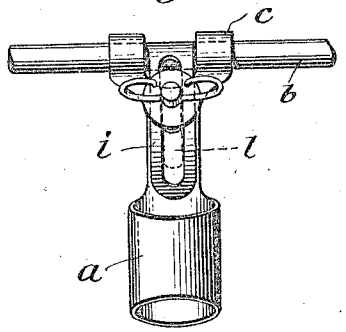
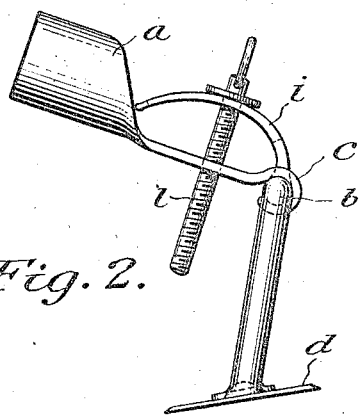
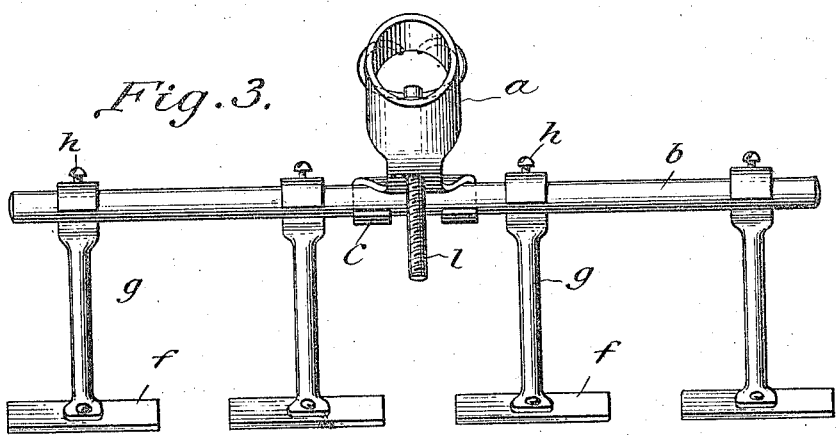

UNITED STATES PATENT OFFICE.

WILHELM SCHULTZ, OF STENDAL, GERMANY.

HOE.

1,072,657.     Specification of Letters Patent.     Patented Sept. 9, 1913.

Application filed June 14, 1911. Serial No. 633,203.

*To all whom it may concern:*

Be it known that I, WILHELM SCHULTZ, a subject of the King of Prussia, residing at Stendal, in the Kingdom of Prussia, Germany, have invented certain new and useful Improvements in and Relating to Hoes, of which the following is a specification.

This invention relates to a hoe which has adjustable hoe blades made in one or in several parts.

The hoeing of corn and particularly of summer corn, or of asparagus plantations and the like is more frequently done at present than was formerly the case, as by digging up the weeds the harvest is considerably improved. The hoes of known construction do not permit the hoeing to be done quickly enough.

The present invention relates to an improved hoe of very simple construction in which the hoe blade can be adjusted according to the work to be executed.

In the accompanying drawings two forms of the construction of the improved hoe are shown.

Figure 1 represents in front view a hoe with one blade. Fig. 2 is a side view of Fig. 1. Fig. 3 represents in front view a hoe with several separate blades particularly adapted for hoeing ridge plants. Fig. 4 is a plan view of the socket.

The improved hoe consists of a socket $a$ for the handle and of the support $b$ for the hoe blade or blades. The support $b$ is mounted at the front ends of arms $c$ of the socket $a$ so that it can be turned and adjusted at a suitable angle with regard to the said socket. The hoe blade is fixed to the ends of the lateral arms of said support $b$.

The hoe as described and shown in Figs. 1 and 2 having a long blade $d$ is particularly adapted for weeding large surfaces. If however ridges have to be weeded the hoe shown in Fig. 3 is preferably used. This improved hoe has a certain number of separate hoe blades, four in the drawing, which are fixed on the support $b$ so that the distance between two hoe blades $f$ is equal to the width of the ridge. The hoe blades $f$ are fixed on the support $b$ by means of shafts $g$ which form sleeves at the upper end adapted to grip over the rodshaped support $b$; said sleeves are secured in the proper position by means of clamping screws $h$.

In order to adjust the angular position of the hoe blade or blades with regard to the socket $a$, a regulating device is provided which consists of a yoke $i$ fixed to the support $b$ and having at its enlarged end a slot in which the regulating screw $l$ is guided. The lower end of the said screw engages a threaded opening in the socket $a$.

I claim:—

1. An improved hoe comprising in combination a socket for the handle having a threaded opening serving as a nut, arms on said socket curved at their front ends, a rod mounted in said curved ends of said arms, a yoke fixed to said rod and having a slot in its enlarged end, a regulating screw mounted in said opening of the socket and passing through said slot of the yoke, and a hoe blade fixed to the ends of the supporting rod, substantially as described and shown and for the purpose set forth.

2. An improved hoe comprising in combination a socket for the handle having a threaded opening serving as a nut, arms on said socket curved at their front ends, a rod mounted in said curved ends of said arms, a yoke fixed to said rod and having a slot in its enlarged end, a regulating screw mounted in said opening of the socket and passing through said slot of the yoke, several hoe blades, shafts on said hoe blades, sleeves at the upper end of said shafts adjustably mounted on the supporting rod and clamping screws for securing the sleeves in position substantially as described and shown and for the purpose set forth.

In witness whereof I have hereunto set my hand in the presence of two witnesses.

WILHELM SCHULTZ.

Witnesses:
WILHELM LEHMANN,
HEINRICH THOMAS.